US009753500B2

(12) United States Patent
Kano

(10) Patent No.: US 9,753,500 B2
(45) Date of Patent: Sep. 5, 2017

(54) DISPLAY DEVICE INCLUDING PRESENCE SENSORS FOR DETECTING USER, AND DISPLAY METHOD FOR THE SAME

(75) Inventor: Nozomu Kano, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 14/413,227

(22) PCT Filed: Jul. 6, 2012

(86) PCT No.: PCT/JP2012/067382
§ 371 (c)(1),
(2), (4) Date: Jan. 6, 2015

(87) PCT Pub. No.: WO2014/006757
PCT Pub. Date: Jan. 9, 2014

(65) Prior Publication Data
US 2015/0192967 A1    Jul. 9, 2015

(51) Int. Cl.
*G06F 1/16* (2006.01)
*G09G 5/00* (2006.01)
(Continued)

(52) U.S. Cl.
CPC .............. *G06F 1/1694* (2013.01); *G06T 3/60* (2013.01); *G09G 5/00* (2013.01);
(Continued)

(58) Field of Classification Search
None
See application file for complete search history.

(56) References Cited

U.S. PATENT DOCUMENTS 8,952,890 B2 * 2/2015 Iida .......................... H04N 5/64
345/156
2005/0253807 A1 * 11/2005 Hohmann ............... G06F 3/043
345/156
(Continued)

FOREIGN PATENT DOCUMENTS

CN       1949905 A       4/2007
CN       101063928       10/2007
(Continued)

OTHER PUBLICATIONS

Japanese Office Action in Japanese Application No. 2014-523538 dated Aug. 11, 2015 with a partial English translation thereof.
(Continued)

*Primary Examiner* — Hilina K Demeter
(74) *Attorney, Agent, or Firm* — McGinn IP Law Group, PLLC

(57) ABSTRACT

A display device includes: a display unit that includes a display screen displaying an image, a first side extending in a long direction of the display unit, and a second side extending in a short direction of the display unit; a first presence sensor that is provided on the first side; a second presence sensor that is provided on the second side; a display screen detecting unit that detects whether the display screen of the display unit is in a vertical orientation or a horizontal orientation; and a control unit that obtains a detection result of either one of the first presence sensor and the second presence sensor in accordance with the orientation detected by the display screen detecting unit, the control unit controlling display of an image on the display unit based on the obtained detection result.

16 Claims, 6 Drawing Sheets

(51) Int. Cl.
    *H04N 21/422*      (2011.01)
    *H04N 21/442*      (2011.01)
    *H04N 21/485*      (2011.01)
    *G06T 3/60*      (2006.01)
    *H04N 5/64*      (2006.01)

(52) U.S. Cl.
    CPC . *H04N 21/42201* (2013.01); *H04N 21/44218* (2013.01); *H04N 21/4858* (2013.01); *G09G 5/003* (2013.01); *G09G 2330/021* (2013.01); *G09G 2340/0492* (2013.01); *G09G 2354/00* (2013.01); *H04N 5/64* (2013.01)

(56) References Cited

U.S. PATENT DOCUMENTS

| | | | | |
|---|---|---|---|---|
| 2009/0303200 | A1* | 12/2009 | Grad | G06F 3/0416 345/173 |
| 2010/0066763 | A1* | 3/2010 | MacDougall | G06F 1/1626 345/656 |
| 2011/0264928 | A1* | 10/2011 | Hinckley | G06F 1/1626 713/300 |
| 2012/0127069 | A1* | 5/2012 | Santhiveeran | G06F 1/1686 345/156 |
| 2012/0154266 | A1* | 6/2012 | Cho | G06F 1/1626 345/156 |
| 2012/0206340 | A1* | 8/2012 | Mori | G09G 5/00 345/156 |
| 2013/0027860 | A1* | 1/2013 | Masaki | G06F 1/1626 361/679.01 |
| 2013/0194176 | A1* | 8/2013 | Chung | G06F 3/0346 345/156 |
| 2013/0194238 | A1* | 8/2013 | Sakai | H04N 21/4314 345/175 |
| 2013/0201219 | A1* | 8/2013 | Zhao | G06F 3/012 345/649 |
| 2013/0257909 | A1* | 10/2013 | Nagata | G09G 5/38 345/650 |
| 2013/0298146 | A1* | 11/2013 | Conrad | H04N 21/252 725/12 |
| 2014/0354695 | A1* | 12/2014 | Sakai | H04N 21/4312 345/650 |

FOREIGN PATENT DOCUMENTS

| | | | |
|---|---|---|---|
| JP | 2008-054085 | A | 3/2008 |
| JP | 2008-294939 | A | 12/2008 |
| JP | 2011-061300 | A | 3/2011 |
| JP | 2011-147135 | A | 7/2011 |
| JP | 2011221094 | A * | 11/2011 |
| JP | 2011-259384 | A | 12/2011 |
| JP | 2012-060504 | A | 3/2012 |
| WO | WO 2011/053059 | A2 | 5/2011 |

OTHER PUBLICATIONS

International Search Report (ISR) (PCT Form PCT/ISA/210), in PCT/JP2012/067382, dated Sep. 18, 2012.
Chinese Office Action, dated Mar. 31, 2017, in Chinese Patent Application No. 201280074515.5 and English Translation thereof.

* cited by examiner

Prior Art

Prior Art

DISPLAY DEVICE INCLUDING PRESENCE SENSORS FOR DETECTING USER, AND DISPLAY METHOD FOR THE SAME

TECHNICAL FIELD

The present invention relates to a display device that has a presence sensor, and a control method for a display device.

BACKGROUND ART

In a display device that includes a rotating hinge-equipped stand, the display screen can be used in either state of a horizontal orientation or vertical orientation depending on the application of the user. A horizontal orientation is an orientation in which the long sides of the display screen are in the horizontal direction, and the short sides are in the vertical direction. A vertical orientation is an orientation in which the short sides of the display screen are in the horizontal direction, and the long sides are in the vertical direction.

Also, some display devices include a presence sensor (for example, Patent Document 1).

A display device that includes a presence sensor detects a user being in front of the display device, and controls the display device in accordance with the detection result. The presence sensor is installed at a different location from the display screen of the display device. Normally, since it performs detection with the display screen center of the display device serving as a reference, the presence sensor is arranged at the peripheral edge of the display screen in the vicinity of a vertical line that passes through the display screen center. In FIG. 6, a display screen 101 is in the horizontal orientation, and a presence sensor 102 is provided in the vicinity of a vertical line that passes through the display screen center, on the peripheral edge portion of the lower side, among the horizontal direction sides (long sides) of the display screen.

However, in the case of installing a presence sensor on the basis of the horizontal orientation, in consideration of the sensor detection range 104, in order to correctly detect a user who is at the front side of the display screen, the presence sensor is installed at the center position of the lower side of the long sides. Thereby, in the case of a user 103 being at the front of the display device, the detection range 104 of the presence sensor can easily detect the user 103.

On the other hand, in the case of a user using the display device in a vertical orientation state, due to being in a vertical orientation, the positions of the short sides and the long sides of the display device change. For that reason, as shown in FIG. 7, the presence sensor 102 comes to be positioned on the long side of the display screen 101, and so becomes separated from the vertical line that passes through the display screen center. Thereby, the center of the detection range of the presence sensor 102 deviates from the center of the display screen. For that reason, there is a drop in the accuracy of the detection range 104 of the presence sensor 102 correctly detecting the user 103 being at the front side of the display device, and so even if the user is at the front of the display device, the user may be erroneously judged as being not present.

PRIOR ART DOCUMENTS

Patent Document

[Patent Document 1] Japanese Unexamined Patent Application, First Publication No. 2011-147135

SUMMARY OF THE INVENTION

Problem to be Solved by the Invention

The problem to be solved is the point of cases occurring in which the presence sensor cannot correctly detect a user when the orientation of the screen of the display device is changed.

Means for Solving the Problem

In order to solve the aforementioned problem, the present invention includes: a display unit that displays an image; a first presence sensor that is provided on a long length direction side of the display unit; a second presence sensor that is provided on a short length direction side of the display unit; a display screen detecting unit that detects whether a display screen of the display unit is in a vertical orientation or a horizontal orientation; and a control unit that obtains a detection result of either one of the first presence sensor and the second presence sensor in accordance with the orientation detected by the display screen detecting unit, the control unit controlling display of an image on the display unit based on the obtained detection result.

Also, the present invention is such that it is detected whether a display screen of a display unit that displays an image is in a vertical orientation or a horizontal orientation; and it is obtained a detection result of either one of a first presence sensor provided on a long length direction side of the display unit and a second presence sensor provided on a short length direction side of the display unit in accordance with the detected orientation, and, controlling display of an image on the display unit based on the obtained detection result.

Effect of the Invention

According to the invention, presence sensors are installed at two locations of a long side and a short side of a display device, and in accordance with the horizontal orientation and vertical orientation state of the display device, the sensor that performs detection is switched. Thereby, whether in the horizontal orientation or the vertical orientation, the presence sensor is arranged in front of the user, and so it is possible to prevent a drop in the accuracy of detecting the presence of a user.

EMBODIMENTS FOR CARRYING OUT THE INVENTION

Hereinbelow, a present exemplary embodiment shall be described.

Figure 1:
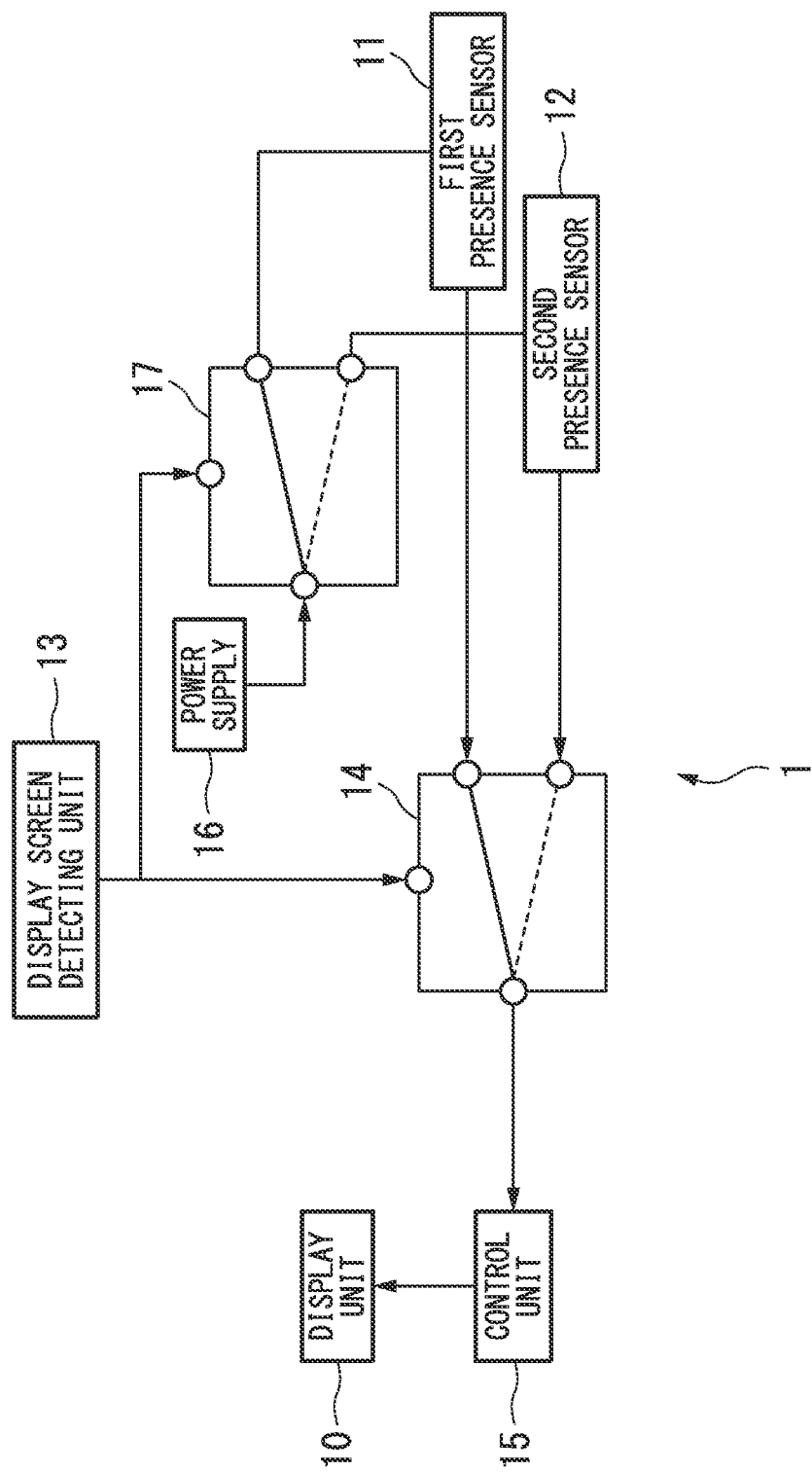
FIG. 1 is a function block diagram that shows the configuration of a display device 1 in a present exemplary embodiment.

FIG. 1 is a function block diagram that shows the configuration of a display device 1 in the present exemplary embodiment.

A display unit 10 displays an image. The display screen of this display unit 10 has a rectangular shape. This display unit 10 is attached to a display device 1 by a rotating hinge-equipped stand. This rotating hinge-equipped stand is a mechanism that couples the display unit 10 to the display device 1, and is a mechanism that, when the display device 1 is installed, enables a vertical orientation or horizontal orientation of the display unit 10 to be selected and switched by the user. A vertical orientation is an orientation in which the long length direction sides of the display screen are in the vertical direction, and the short length direction sides are in the horizontal direction. Also, the vertical orientation state is called portrait. A horizontal orientation is an orientation in which the long length direction sides of the display screen are in the horizontal direction, and the short length direction sides are in the vertical direction. Also, the horizontal orientation state is called landscape.

A first presence sensor 11 is provided on a long length direction side of the display unit 10.

A second presence sensor 12 is provided on a short length direction side of the display unit 10.

The first presence sensor 11 and the second presence sensor 12 are sensors that detect whether or not a user is present in their detection ranges, and output a detection result that shows the presence/absence of a user.

A display screen detecting unit 13 detects whether the display screen of the display unit 10 is in a vertical orientation or horizontal orientation.

For example, an acceleration sensor is used for this display screen detecting unit 13. This acceleration sensor can detect whether the screen of the display unit 10 is in a vertical orientation or horizontal orientation by detecting gravity.

A sensor output switching switch 14 is connected to the first presence sensor 11 and the second presence sensor 12. This sensor output switching switch 14 selects and outputs the detection result of either one of the first presence sensor 11 and the second presence sensor 12 in accordance with the orientation of the display unit 10 that the display screen detecting unit 13 has detected. Specifically, in the case of the detection result of the display screen detecting unit 13 being a horizontal orientation, the sensor output switching switch 14 switches so as to output the detection result of the first presence sensor 11, and in the case of the detection result of the display screen detecting unit 13 being a vertical orientation, it switches so as to output the detection result of the second presence sensor 12.

In accordance with the orientation detected by the display screen detecting unit 13, the control unit 15 obtains the detection result of either one of the first presence sensor 11 and the second presence sensor 12, and controls the display of the image on the display unit 10 based on the obtained detection result. That is to say, when the display screen detecting unit 13 detects a horizontal orientation, and the sensor output switching switch 14 switches so as to output the detection result of the first presence sensor 11, the control unit 15 performs control based on the detection result of the first presence sensor 11. Likewise, when the display screen detecting unit 13 detects a vertical orientation, and the sensor output switching switch 14 switches so as to output the detection result of the second presence sensor 12, the control unit 15 performs control based on the detection result of the second presence sensor 12.

In reference to the detection result of the first presence sensor 11 or the second presence sensor 12, this control unit 15 performs control so as to display an image on the display unit 10 in the case of a user being detected in the vicinity of the display unit 10, and so as to not display an image on the display unit 10 in the case of a user being not detected in the vicinity of the display unit 10.

A power supply 16 supplies electrical power.

A sensor power switching switch 17 has a switching switch that performs switching so as to supply electrical power that is supplied from the power supply 16 to either of the first presence sensor 11 or the second presence sensor 12 in accordance with the detection result of the display screen detecting unit 13.

Specifically, the sensor power switching switch 17 switches the switch to the first presence sensor 11 and supplies power thereto when the detection result of the display screen detecting unit 13 is a horizontal orientation, and switches the switch to the second presence sensor 12 and supplies power thereto when the detection result of the display screen detecting unit 13 is a vertical orientation.

Figure 2:
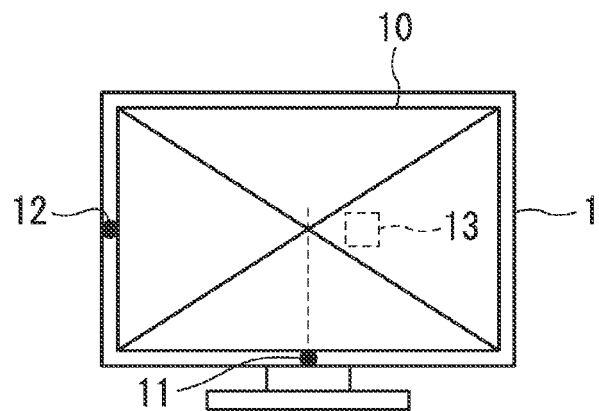
FIG. 2 is a diagram that shows an overview of the display device 1.

FIG. 2 is a diagram that shows an overview of the display device 1. This diagram shows the case of the display unit 10 in a horizontal orientation.

The display unit 10 is provided on the front side of the display device 1, and the display screen detecting unit 13 is provided on the back side of the display device 1. Also, the first presence sensor 11 is provided on one side of long sides of the display unit 10, and the second presence sensor 12 is provided on one side of short sides of the display unit 10.

Figure 3:
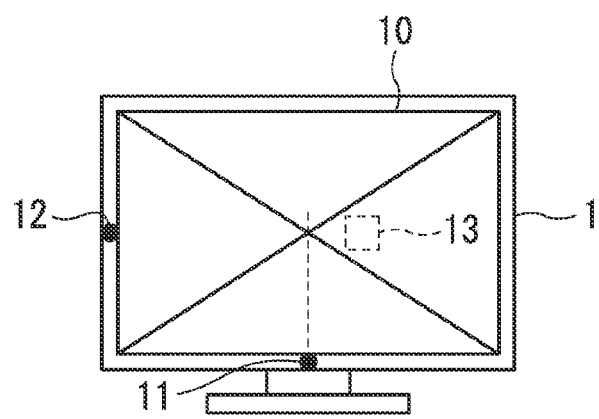
FIG. 3 is a diagram for describing the arrangement of a first presence sensor 11 and a second presence sensor 12 in the case of a display unit 10 being in a horizontal orientation.
Figure 3:
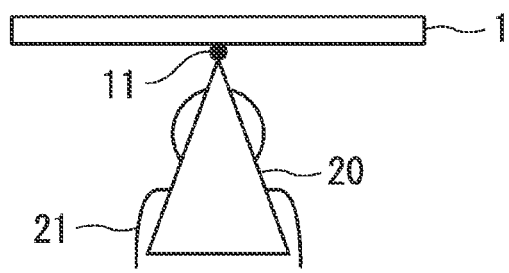

FIG. 3 is a diagram for describing the arrangement of the first presence sensor 11 and the second presence sensor 12 in the case of the display unit 10 being in a horizontal orientation.

In this figure, in the display device 1, the first presence sensor 11 is provided on a long side of the display unit 10, and the second presence sensor 12 on a short side. In this case, the first presence sensor 11 detects whether or not a user 21 exists within a detection range 20, which is the detectable range of the first presence sensor 11.

Figure 4:
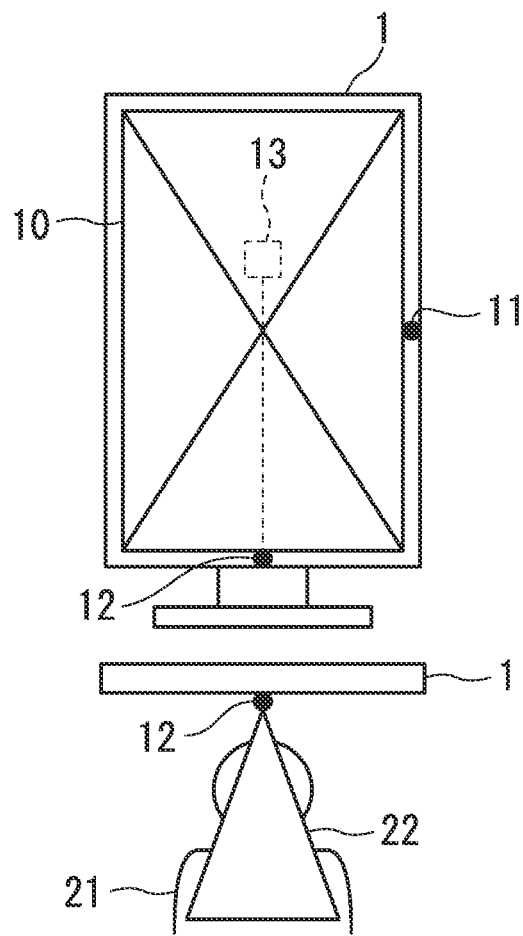
FIG. 4 is a diagram for describing the arrangement of the first presence sensor 11 and the second presence sensor 12 in the case of the display unit 10 being in a vertical orientation.

FIG. 4 is a diagram for describing the arrangement of the first presence sensor 11 and the second presence sensor 12 in the case of the display unit 10 being in a vertical orientation.

In this figure, in the display device 1, the first presence sensor 11 is provided on a long side of the display unit 10, and the second presence sensor 12 is provided on a short side. In this case, the second presence sensor 12 detects whether or not the user 21 exists within a detection range 22, which is the detectable range of the second presence sensor 12.

Figure 5:
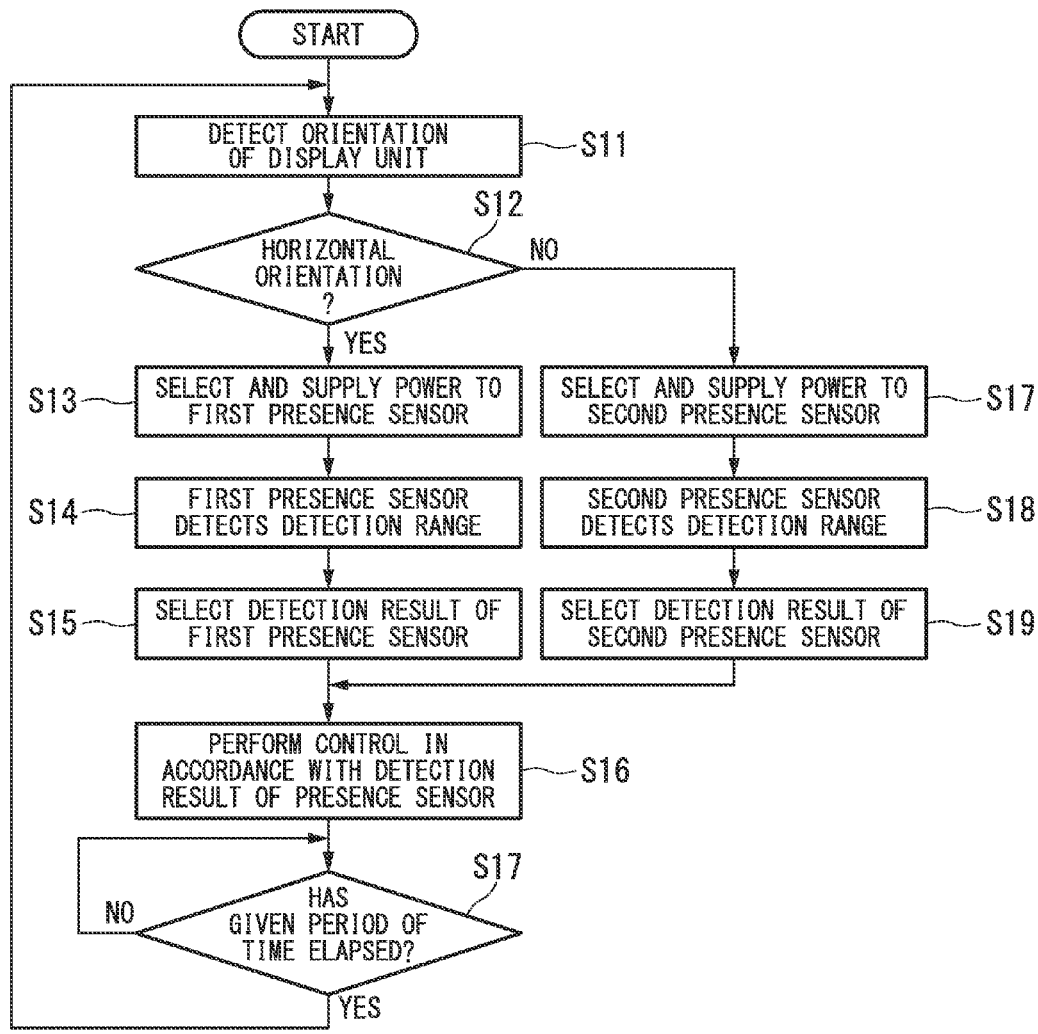
FIG. 5 is a flowchart for describing the operation of the display device 1.
Figure 6:
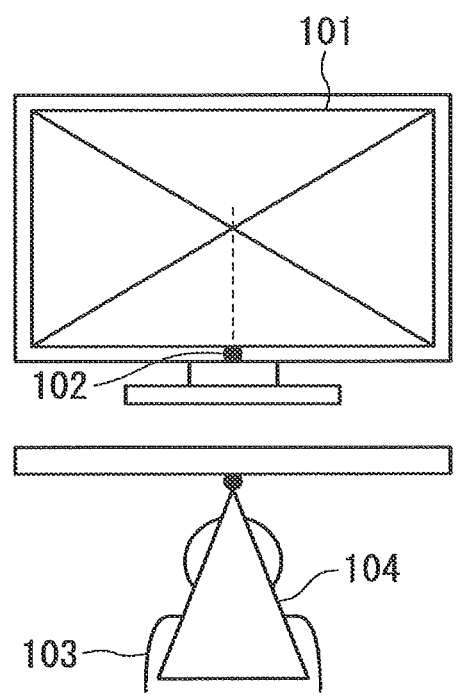
FIG. 6 is a diagram for describing the detection range of a presence sensor and the user position.
Figure 7:
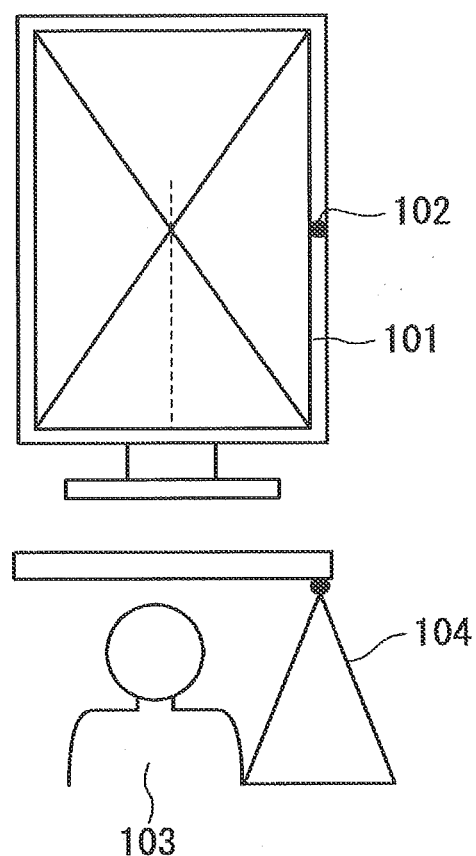
FIG. 7 is a diagram for describing the detection range of a presence sensor and the user position.

Next, the operation of the aforementioned display device 1 shall be described. FIG. 5 is a flowchart for describing the operation of the display device 1.

First, the display screen detecting unit 13 of the display device 1 detects the orientation of the display unit 10 (Step S11), then determines whether or not it is in a horizontal orientation (Step S12), and outputs the orientation detection result including the determination result to the sensor output switching switch 14 and the sensor power switching switch 17.

In the case of the detection result indicating a horizontal orientation, the sensor power switching switch 17 selects the first presence sensor 11, and supplies power to the first presence sensor 11 (Step S13). The first presence sensor 11 detects whether or not a user is within the detection range (Step S14). The sensor output switching switch 14 selects the detection result of the first presence sensor 11 and outputs it to the control unit 15 (Step S15). The control unit 15, based on the detection result of the first presence sensor 11, performs control of the image to be displayed on the display unit 10 (Step S16). The control unit 15 determines whether or not a given period of time has elapsed (Step S17), and in the case of the given period of time having elapsed, instructs the display screen detecting unit 13 to detect the orientation of the display unit 10. Thereby, the processing transitions to Step S11.

On the other hand, in Step S12, in the case of the detection result not indicating a horizontal orientation, that is, in the case of indicating a vertical orientation, the sensor power switching switch 17 selects the second presence sensor 12, and supplies power to the second presence sensor 12 (Step S17). The second presence sensor 12 detects whether or not a user is within the detection range (Step S18). The sensor output switching switch 14 selects the detection result of the second presence sensor 12 and outputs it to the control unit 15 (Step S19). The control unit 15, based on the detection result of the second presence sensor 12, performs control of the image to be displayed on the display unit 10 (Step S16). The control unit 15 determines whether or not a given period of time has elapsed (Step S17), and in the case of the given period of time having elapsed, instructs the display screen detecting unit 13 to detect the orientation of the display unit 10. Thereby, the processing transitions to Step S11.

According to the exemplary embodiment described above, a presence sensor is provided at two locations of the display device, and switching between the presence sensors of these two locations is performed by an acceleration sensor installed in the display device. Thereby, since it is possible to detect the presence/absence of a user by using the presence sensor that is on a vertical line passing through the center of the display screen of the display unit 10, regardless of whether the display screen of the display device is in a horizontal orientation state or a vertical orientation state, the presence sensor can detect the presence of a user, and so it is possible execute control necessary for the display device without lowering the detection accuracy of the presence sensor.

Also, the presence sensors of these two locations are switched by the acceleration sensor installed in the display device. Thereby, there is no need for the user himself to select which presence sensor to use upon changing the orientation of the display unit 10.

Also, according to this exemplary embodiment, in accordance with the orientation of the display unit, one of the first presence sensor 11 or the second presence sensor 12 is selected and power is supplied thereto. Thereby, it is possible to stop the power supply to the presence sensor that is not being used for user detection, and it is possible to stop the operation of that presence sensor. Thereby, it is possible to prevent unnecessary power consumption in the presence sensor that is not being used, and compared to the case of always supplying power to both presence sensors, it is possible to reduce power consumption.

In the aforementioned exemplary embodiment, the case is described of using an acceleration sensor as the display screen detecting unit 13. By installing a mechanical switching switch that detects whether or not the display unit 10 is in a vertical orientation or a horizontal orientation in a pivoting stand instead of an acceleration sensor, whether the display unit 10 is in a vertical orientation or a horizontal orientation may be detected, and the detection result may be supplied to the sensor output switching switch 14 and the sensor power switching switch 17.

Also, in the aforementioned exemplary embodiment, the presence sensor 11 is provided so as to be positioned on the lower side in the case of a horizontal orientation, but it may be provided so as to be positioned on the upper side in the case of a horizontal orientation. The presence sensor 12 is provided so as to be positioned on the lower side in the case of a vertical orientation, but it may be provided so as to be positioned on the upper side in the case of a vertical orientation.

Also, the presence sensor 11 and the presence sensor 12 are each provided at a middle position of a side, but provided they are at a position of the side, they do not necessary need to be in the middle.

Also, in the aforementioned exemplary embodiment, the cases are described of selecting the presence sensor 11 in the case of a horizontal orientation and selecting the presence sensor 12 in the case of a vertical orientation. But provided it is possible to select a presence sensor whose detection range is the front of the display device 1 when in a horizontal orientation, and to select a presence sensor whose detection range is the front of the display device 1 when in a vertical orientation, the presence sensors may be installed on any side. Also, in the aforementioned exemplary embodiment, the case of using one presence sensor on one side is described. But two or more may be provided on one side, and in accordance with the orientation of the display unit 10, the presence sensor group that is provided on a side of the display unit 10 that is horizontal may be selected.

Similar effect can be realized by causing both to always operate, without switching between the first presence sensor 11 and the second presence sensor 12.

A program for realizing the functions of the display device in FIG. 1 may be recorded on a computer-readable recording medium, and by reading the program that is recorded on this recording medium into a computer system and running it, the display control may be performed. A "computer system" here includes an operating system and hardware such as peripheral devices.

Also, the "computer system" in the case of using a WWW system also includes a homepage providing environment (or display environment).

Furthermore, the "computer-readable recording medium" refers to a portable medium such as a flexible disk, a magneto-optical disk, ROM, CD-ROM and the like, and a storage device such as a hard disk that is housed in a computer system. Moreover the "computer-readable recording medium" also includes one that retains a program for a given period of time, such as a volatile memory in a computer system that functions as a server or client. The abovementioned program may be one for realizing some of the functions described above, and moreover may be one capable of realizing the abovementioned functions in combination with a program that has already been stored in the computer system. Further, the program described above may be stored in a predetermined server, and may be distributed (downloaded and the like) via communication lines in accordance with a request from another device.

While the exemplary embodiment of the present invention has been described above in detail with reference to the drawings, a specific configuration is not limited to this exemplary embodiment and designs or the like in a range not departing from the scope of the present invention are also included.

REFERENCE SYMBOLS

1: Display device
10: Display unit
11: First presence sensor
12: Second presence sensor
13: Display screen detecting unit
14: Sensor output switching switch
15: Control unit
16: Power supply
17: Sensor power switching switch

The invention claimed is:

1. A display device, comprising:
a displayer that includes a display screen displaying an image, a first side extending in a long direction of the displayer, and a second side extending in a short direction of the displayer;
a first presence sensor that is provided on the first side, the first presence sensor detecting whether or not a user is present in a first detection range of the first presence sensor;
a second presence sensor that is provided on the second side, the second presence sensor detecting whether or not the user is present in a second detection range of the second presence sensor;
a display screen detector that detects whether the display screen of the displayer is in a vertical orientation or a horizontal orientation;
a controller that obtains a detection result of one of the first presence sensor and the second presence sensor in accordance with the orientation detected by the display screen detector, the controller controlling display of an image on the displayer based on the obtained detection result, wherein the first detection range is in front of the displayer when the display screen is in the horizontal orientation, and the second detection range is in front of the displayer when the display screen is in the vertical orientation; and
a power switch that supplies electrical power supplied from a power supply to one of the first presence sensor and the second presence sensor in accordance with the detection result of the display screen detector,
wherein one of the first and second presence sensors is on a vertical line passing through a center of the display screen of the displayer.

2. The display device according to claim 1, further comprising:
a sensor output switching switch that selects and outputs a detection result of one of the first presence sensor and the second presence sensor in accordance with the orientation of the displayer detected by the display screen detector,
wherein the controller obtains the detection result selected and output by the sensor output switching switch, and controls display of an image on the displayer based on the obtained detection result.

3. The display device according to claim 2, wherein the controller controls display of an image on the displayer based on a detection result of the second presence sensor in a case where the display screen detector detects that the display screen of the displayer is in the vertical orientation, and
wherein the controller controls display of an image on the displayer based on a detection result of the first presence sensor in a case where the display screen detector detects that the display screen of the displayer is in the horizontal orientation.

4. The display device according to claim 1, wherein the controller controls display of an image on the displayer based on a detection result of the second presence sensor in a case where the display screen detector detects that the display screen of the displayer is in the vertical orientation, and
wherein the controller controls display of an image on the displayer based on a detection result of the first presence sensor in a case where the display screen detector detects that the display screen of the displayer is in the horizontal orientation.

5. The display device according to claim 1, further comprising:
a sensor output switching switch that outputs the detection result of the first presence sensor after a detection result of the display screen detector is the horizontal orientation.

6. The display device according to claim 5, wherein the power switch supplies power to the first presence sensor after the detection result of the display screen detector is the horizontal orientation.

7. The display device according to claim 6, wherein the power switch supplies power to only the first presence sensor after the detection result of the display screen detector is the horizontal orientation.

8. The display device according to claim 7, wherein the controller performs control based on the detection result of the first presence sensor.

9. The display device according to claim 5, wherein the controller performs a control based on the detection result of the first presence sensor.

10. The display device according to claim 5, wherein the sensor output switching switch switches to output the detection result of the second presence sensor after the detection result of the display screen detector is the vertical orientation.

11. A control method for a display device, the display device including a display unit displaying an image, the control method comprising:
detecting whether a display screen of the display unit is in a vertical orientation or a horizontal orientation;
obtaining a detection result of one of a first presence sensor and a second presence sensor, the first presence sensor being provided on a first side of the display unit and detecting whether or not a user is present in a first detection range of the first presence sensor, the second presence sensor being provided on a second side of the display unit in accordance with the detected orientation and detecting whether or not the user is present in a second detection range of the second presence sensor, the first side extending in a long direction of the display unit, the second side extending in a short direction of the display unit;
controlling display of an image on the display unit based on the obtained detection result; and
supplying, by a power switch, electrical power from a power supply to one of the first presence sensor and the second presence sensor in accordance with the detection result of said detecting, wherein the first detection range is in front of the display unit when the display screen is in the horizontal orientation, and the second detection range is in front of the display unit when the display screen is in the vertical orientation, and wherein one of the first and second presence sensors is on a vertical line passing through a center of the display screen of the display unit.

12. The control method according to claim 11, further comprising:

outputting, by a sensor output switching switch, the detection result of the first presence sensor after detecting that the display screen is in the horizontal orientation.

13. The control method according to claim 12, wherein the power switch supplies power to the first presence sensor after said detecting that the display screen is in the horizontal orientation.

14. The control method according to claim 13, wherein the sensor output switching switch switches to output the detection result of the second presence sensor after detecting that the display screen is in the vertical orientation.

15. The control method according to claim 12, wherein the power switch supplies power to only the first presence sensor after said detecting that the display screen is in the horizontal orientation.

16. The control method according to claim 15, wherein said controlling comprises performing a control based on the detection result of the first presence sensor.

\* \* \* \* \*